(12) United States Patent
Kawamoto

(10) Patent No.: US 9,877,355 B2
(45) Date of Patent: Jan. 23, 2018

(54) WIRELESS COMMUNICATOR CONNECTABLE TO DIFFERENT TYPES OF WIRELESS COMMUNICATION NETWORKS

(71) Applicant: Oki Electric Industry Co., Ltd., Tokyo (JP)

(72) Inventor: Yasutaka Kawamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 215 days.

(21) Appl. No.: 14/548,907

(22) Filed: Nov. 20, 2014

(65) Prior Publication Data
US 2015/0189693 A1 Jul. 2, 2015

(30) Foreign Application Priority Data
Dec. 26, 2013 (JP) .................................. 2013-268631

(51) Int. Cl.
*H04W 84/22* (2009.01)
*H04W 92/02* (2009.01)

(52) U.S. Cl.
CPC ............ *H04W 84/22* (2013.01); *H04W 92/02* (2013.01)

(58) Field of Classification Search
CPC ..... H04W 84/22; H04W 92/02; H04W 88/06; H04W 88/16
See application file for complete search history.

(56) References Cited

U.S. PATENT DOCUMENTS

| 2002/0037009 A1* | 3/2002 | Sato .................. H04L 29/12009 370/395.31 |
| 2002/0194367 A1* | 12/2002 | Nakamura .......... H04L 12/2856 709/238 |
| 2004/0165563 A1 | 8/2004 | Hsu et al. |

(Continued)

FOREIGN PATENT DOCUMENTS

| JP | 2005-136984 A | 5/2005 |
| JP | 2006-518972 A | 8/2006 |

(Continued)

OTHER PUBLICATIONS

IEEE std 802.15.4$^{th}$-2011 (Revision of IEEE Std 802.15.4—2006), IEEE Computer Society; "IEEE Standard for local and Metropolitan area networks—Part 15.4: Low-Rate Wireless Personal Area Networks (LR-WPANs)" Sep. 5, 2011.

*Primary Examiner* — Jeffrey M Rutkowski
*Assistant Examiner* — Fangyan Deng
(74) *Attorney, Agent, or Firm* — Rabin & Berdo, P.C.

(57) ABSTRACT

A wireless communicator includes network processors transmitting data to and receiving data from respective different networks; a media access control (MAC) setter receiving pieces of information on a MAC layer from the plurality of network processors and storing the pieces of information on the MAC layer; and a MAC processor performing operations on media access control on the basis of the pieces of information stored in the MAC setter. In the wireless communicator, the network processors supply a frame signal containing network identification information corresponding to the respective network processors to the MAC processor. Thus, it is possible to provide a wireless communicator which can give a notice to every network processor even when broadcast frames are received and which can make a reply even when beacon request command frames are received.

20 Claims, 7 Drawing Sheets

(56) References Cited

U.S. PATENT DOCUMENTS

| | | | |
|---|---|---|---|
| 2005/0090264 A1 | 4/2005 | Kim | |
| 2009/0316628 A1* | 12/2009 | Enns | H04L 12/40006 370/328 |
| 2010/0020775 A1* | 1/2010 | Tomizu | H04W 68/12 370/338 |
| 2011/0063999 A1 | 3/2011 | Erdmann et al. | |
| 2011/0289175 A1* | 11/2011 | Lee | H04W 28/26 709/208 |
| 2014/0122650 A1* | 5/2014 | Lim | H04W 76/025 709/218 |
| 2014/0194156 A1 | 7/2014 | Chen | |

FOREIGN PATENT DOCUMENTS

| | | |
|---|---|---|
| JP | 2009-088750 A | 4/2009 |
| JP | 2009-100327 A | 5/2009 |
| JP | 2011-523830 A | 8/2011 |
| JP | 2011-525333 A | 9/2011 |
| JP | 2013-021402 A | 1/2013 |
| WO | WO 2009-155411 A2 | 12/2009 |

* cited by examiner

FIG. 3

| FRAME CONTROL | SEQUENCE | DESTINATION PAN ID | DESTINATION ADDRESS | SOURCE PAN ID | SOURCE ADDRESS | PAYLOAD | FCS |
|---|---|---|---|---|---|---|---|
| 2 BYTES | 1 BYTE | 0–20 BYTES | | | | | 2 BYTES |

PRIOR ART

WIRELESS COMMUNICATOR CONNECTABLE TO DIFFERENT TYPES OF WIRELESS COMMUNICATION NETWORKS

BACKGROUND OF THE INVENTION

Field of the Invention

The present invention relates to a wireless communicator and more in particular to a wireless communicator connectable to different types of wireless communication networks.

Description of the Background Art

In recent years, it has been required to efficiently manage energy used within a local community and a home by spreading management systems known as smart communities, smart houses, smart meters and so on.

For example, a home energy management system (HEMS) and a building energy management system (BEMS) and other systems are proposed to control electric power consumption in a house/building. In the HEMS and the BEMS, the electrical power consumption to be controlled is measured by a distribution board and a smart tap such as an electrical outlet equipped with a communicator in the house/building to collect the values of electrical powers used in the house/building. Furthermore, a smart meter network system is also proposed in which the smart meters automatically measure used amounts of electric power, gas, water and so on, the system receiving the used amounts measured by the smart meters to control the utilities.

IEEE802.15.4, which is established by the Institute of Electrical and Electronics Engineers, Inc., is always available as a standardized specification for the physical layer and the media access control (MAC) layer of wireless communicators constituting a short-distance wireless network. IEEE802.15.4 is a standardized specification in which emphases are placed on costs and power consumption reduction. This standard is appropriate for the above-described wireless networks.

It is required that an apparatus such as a gateway device be connected with various types of networks as well as wireless local area networks (LANs) to receive data and supply the data to servers via the Internet.

In addition, in order to reduce the cost of hardware such as a radio frequency large scale integration (RF-LSI), it is desired that a common data processing circuitry is used for both the physical and the MAC layers. In this case, a gateway device needs to include a plurality of network processors capable of performing processing for a network layer. In the gateway device, a physical (PHY) processor and a MAC processor, which perform processing in lower layers than the network layer, use the common communication channel. It is required that respective network processor use different personal area network identification information (PAN ID).

A MAC processor needs to perform processing while switching the PAN ID according to the network processor that asks for transmission or reception. However, the standardized technique pursuant to IEEE802.15.4 provides no stipulations regarding the method of how to operate the processor when frames having a PAN ID different from the PAN ID set in the MAC processor are received or when frames of a broadcast address are received.

For example, Japanese patent laid-open publication No. 2009-88750 to Saito teaches a management device for managing respective information on a plurality of radio terminals connected to a radio ad hoc network. Furthermore, Japanese patent laid-open publication No. 2009-100327 to Asai teaches a radio network system for quickly detecting the collision of personal area network identification information (PAN ID). However, Saito nor Asai do not provide a solution for the above-mentioned problem.

Where MAC protocol stacks pursuant to IEEE802.15.4 are used, the following problems can arise. Firstly, in the standardized technique of IEEE802.15.4, if frames of a destination PAN ID different from that set in the MAC processor are received, the MAC processor discards the reception frames without transmitting the frames to the network processor. This presents the problem that, if the network processor asks for frame reception, it is necessary for the network processor to urge the MAC processor to modify settings of PAN IDs at some timing. In this respect, if the network processor fails to recognize the timing of the reception frames, then the timing at which the MAC processor is urged to modify the settings of PAN IDs is not obtained. This makes the solution of the problem quite difficult.

Next, upon frame reception, a conventional MAC processor pursuant to IEEE802.15.4 adopts a method of storing the reception frames in a memory and informing a higher-level layer of pointers of the reception frames. However, in this conventional method, if the PAN ID of the reception frames is a broadcast address, then the MAC processor can give a notice of the pointers to only any one of the network processors. This may present the problem that it is impossible to provide a notice to every network processor.

Another possible problem is that, if a MAC processor receives beacon request command frames, then it is not known which network processors should be used in making a reply.

SUMMARY OF THE INVENTION

It is therefore an object of the present invention to provide a wireless communicator which includes a plurality of network processors and which, when MAC protocol stacks pursuant to IEEE802.15.4 are shared between these network processors, operates to register a plurality of sets of network processor addresses and network identification information, e.g. PAN IDs, and to transmit and receive frames to and from the network processors. The wireless communicator is operative to give a notice to all the network processors, even when broadcast frames are received. Furthermore, the wireless communicator is designed to be capable of making a reply even when beacon request command frames are received.

In accordance with the present invention, a wireless communicator includes a plurality of network processors transmitting data to and receiving data from respective different networks; a media access control (MAC) setter receiving pieces of information on a MAC layer from the plurality of network processors and storing the pieces of information on the MAC layer; and a MAC processor performing operations on media access control on the basis of the pieces of information stored in the MAC setter. In the wireless communicator, the plurality of network processors supply a frame signal containing network identification information corresponding to the respective network processors to the MAC processor.

Also In accordance with the present invention, a data storage medium has a computer program recorded, the computer program controlling a computer, when installed and run, to function as a wireless communicator including: a plurality of network processors transmitting data to and receiving data from respective different networks; a media access control (MAC) setter receiving pieces of information on a MAC layer from the plurality of network processors and storing the pieces of information on the MAC layer; and a MAC processor performing operations on media access control on a basis of the pieces of information stored in the MAC setter. The computer program further controls the computer functioning as the wireless communicator so that a frame signal containing network identification information corresponding to the respective network processors is supplied from the plurality of network processors to the MAC processor.

According to the present invention, it is possible to provide a wireless communicator which can communicate with the network processors and which can give a notice to every network processor even when broadcast frames are received. Furthermore, it is also possible to provide a wireless communicator which can make a reply even when beacon request command frames are received.

BRIEF DESCRIPTION OF THE DRAWINGS

The objects and features of the present invention will become more apparent from consideration of the following detailed description taken in conjunction with the accompanying drawings in which:

FIG. 3 is a diagram illustrating a format of data frames of IEEE802.15.4;

DESCRIPTION OF THE PREFERRED EMBODIMENT

Figure 1:
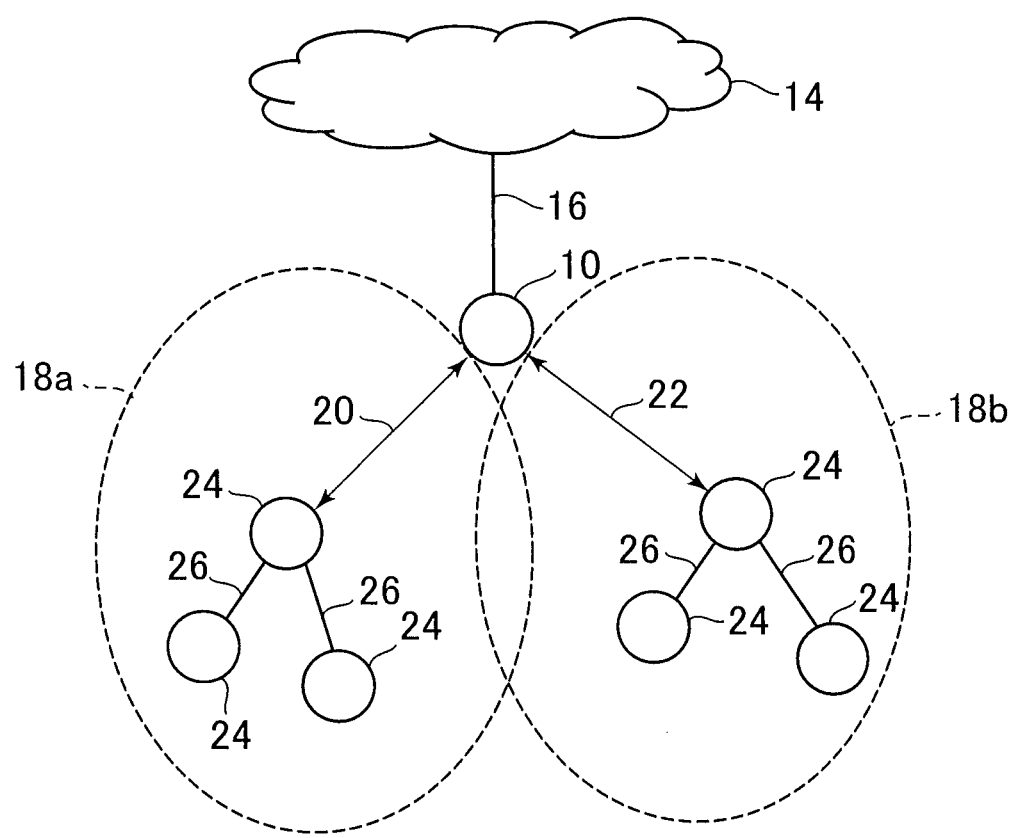
FIG. 1 is a conceptual diagram of a network system including a wireless communicator in accordance with an embodiment of the present invention.

Hereinafter, an embodiment of a wireless communicator according to the present invention will be described in detail with reference to the drawings. In FIG. 1, a wireless communicator 10 is an embodiment of a wireless communicator in accordance with the invention. The wireless communicator 10 is included in a wireless communication network system 12. The wireless communicator 10 may be a gateway device, for example. As another embodiment of the invention, the wireless communicator 10 can be installed in a network device such as a gateway device.

The wireless communicator 10 is connected with a computer network 14 such as the Internet via a wired or wireless communication line 16, a wireless network 18a via a wireless communication line 20 and another wireless network 18b via a wireless communication line 22. The wireless network 18b is a different type of wireless network from the wireless network 18a. The communicator 10 operates to communicate data between the network 14 and the wireless networks 18a and 18b.

In the wireless communicator 10, a physical (PHY) layer and a media access control (MAC) layer can employ a standard according to IEEE802.15.4 (e.g. IEEE802.15.4g, IEEE802.15.4d, IEEE802.15.4PHY, IEEE802.15.4e, IEEE802.15.4MAC and so on). In the physical layer and the MAC layer of the wireless communicator 10, a plurality of network processors make use of a common communication channel.

The wireless network 18a may be different from the wireless network 18b in the type of purpose or application such as a HEMS network, a BEMS network or a smart meter network. In this embodiment, an HEMS network and a smart meter network are exemplified as the wireless networks 18a and 18b, respectively.

In the embodiment, the wireless network 18a which is the HEMS network adopts Zigbee (Trademark) Internet protocol (Zigbee IP). The wireless network 18b which is the smart meter network adopts a wireless smart utility network such as "Wi-SUN" (Trademark).

Each of the wireless networks 18a and 18b includes a plurality of node devices 24. Data are transmitted and received between the node devices 24 through the use of wireless multihop communication 26. Different types of network identification information, which may be indicated as PAN IDs, are given to the respective wireless networks 18a and 18b. The wireless networks 18a and 18b can transmit and receive a frame having a header to which a PAN ID is given.

Figure 2:
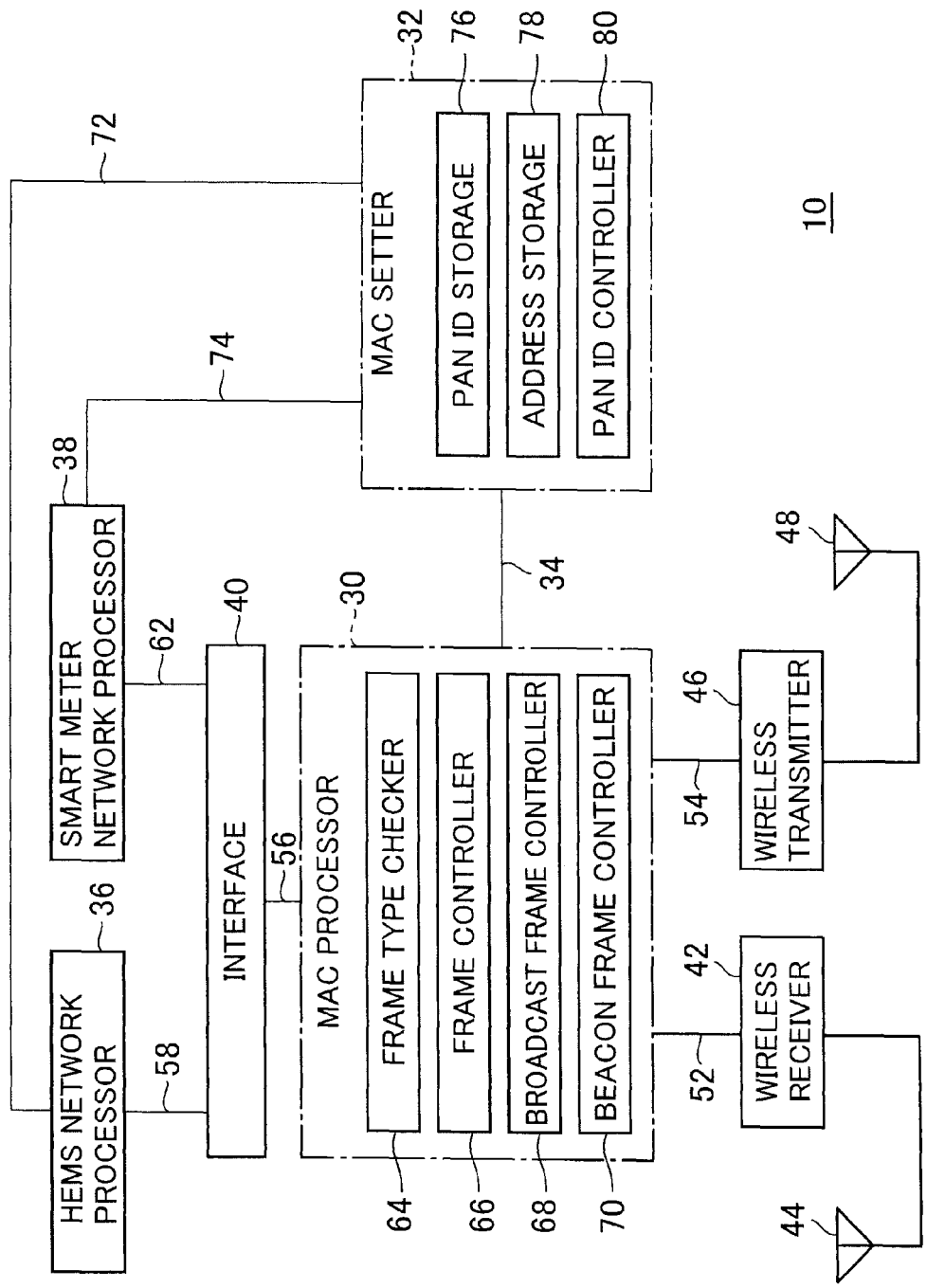
FIG. 2 is an internal block diagram of the wireless communicator in accordance with the embodiment of the invention.

FIG. 2 is an internal block diagram of the wireless communicator 10 associated with the embodiment of the invention. The wireless communicator 10 in FIG. 2 includes a MAC (media access control) processor 30 for processing the MAC layer.

The wireless communicator 10 also includes a MAC setter 32 for setting the MAC layer, which is connected with the communicator 10 via a communicator line 34. The wireless communicator also includes a plurality of network processors 36 and 38 for processing the network layer and an interface 40 for communicating information between the MAC processor 30 and the network processors 36 and 38.

The network processor 36 is intended to process the HEMS network and may be hereinafter also referred to as a HEMS network processor 36. The network processor 38 is intended to process the smart meter network and may be hereinafter also referred to as a smart meter network processor 38.

Furthermore, the wireless communicator 10 includes a wireless receiver 42 with an antenna 44 for receive a receiving signal and a wireless transmitter 46 with an antenna 48 for transmitting a frame signal. The receiver 42 and the transmitter 46 are connected with the MAC processor 30 via communication lines 52 and 54, respectively.

The antenna 44 picks up radio waves to supply picked resulting signal to the wireless receiver 42. On the contrary, the antenna 48 places a transmission signal supplied from the MAC processor 30 on radio waves to transmit the waves containing the signal. The antennas 44 and 48 share a communication channel, or carrier frequency, with the networks 18a and 18b. For example, the frequency band stipulated at IEEE802.15.4g can be utilized.

The wireless receiver 42 receives a received signal from the antenna 44 to form a digital reception frame signal by demodulating the received signal and performing other processes. The receiver 42 further supplies the reception frame signal to the MAC processor 30. The wireless receiver employs a standardized technology stipulated at IEEE802.15.4g and so on.

The wireless transmitter 46 obtains a transmission frame signal from the MAC processor 30 to form an analog signal by modulating the transmission frame signal and performing other processes. The transmitter 46 supplies the analog signal to the wireless networks 18a and 18b by means of the antenna 48. The wireless transmitter 46 also employs a standardized technology stipulated at IEEE802.15.4g and so on.

The MAC processor 30 processes the MAC layer, for example, of IEEE802.15.4g. The MAC processor 30 also performs various operations including control over accesses made by the wireless networks 18a and 18b, connection and disconnection of the wireless networks 18a and 18b, emission of a beacon, synchronization with another wireless communicator and so on. The MAC processor 30 can be made of an RF-LSI which shares both the physical layer and the MAC layer, for example, by using a standardized technology such as IEEE802.15.4g.

The MAC processor 30 is connected with the interface 40 via a communication line 56. The interface 40 is further connected with the HEMS network processor 36 and from the smart meter network processor 38 via communication lines 58 and 62, respectively. When the MAC processor 30 receives a transmission frame signal either from the HEMS network processor 36 or the smart meter network processor 38 via the interface 40, the MAC processor 30 supplies the transmission frame signal to the wireless transmitter 46.

Furthermore, when the MAC processor 30 receives the receive frame signal from the wireless receiver 42, the MAC processor 30 supplies the receive frame signal via the interface 40 to the HEMS network processor 36 or the smart meter network processor 38 on the basis of header information contained in the reception frame.

When the MAC processor 30 receives the reception frame signal, this MAC processor 30 compares a destination PAN ID contained in the header of the receive frame signal obtained from the wireless receiver 42 with a PAN ID stored in and informed from the MAC setter 32 on the communication line 34. If the destination PAN ID conforms with the PAN ID stored in the MAC setter 32, the MAC processor 30 supplies the reception frames to the network processor 36 or 38 corresponding to the destination PAN ID.

As described later, the MAC processor 30 is notified of the PAN IDs of a plurality of network processors from the MAC setter 32, the plurality network processors being shown as the HEMS network processor 36 and the smart meter network processor 38 in FIG. 2. The MAC processor 30 compares the PAN IDs of the plurality of network processors 36 and 38 with the destination PAN ID of the reception frame and then performs a reception operation.

For reference, a conventional method of giving notice of PAN IDs to the MAC processor will be described below. The network processor which requires to transmit and receive a frame signal asks the MAC setter 32 to set a PAN ID. Respective network processors can preliminarily set timings of transmitting and receiving in a manner of time division. In this case, the PAN IDs are set in the MAC processor according to the transmitting and receiving timings of the respective network processors.

However, in the above-described conventional method, if a frame having a destination PAN ID not coincident with any one of the PAN IDs set in the MAC processor is received, the MAC processor discards the reception frames. Therefore, the reception frame cannot be given to the network processors.

In order to solve the problem, in this embodiment, a notice of the PAN IDs of the HEMS network processor 36 and smart meter network processor 38 equipped in the wireless communicator 10 is given. These PAN IDs and the destination PAN ID of the reception frame signal are compared to perform a reception operation. Consequently, discarding of the reception frame signal due to disagreement of PAN IDs as encountered heretofore can be avoided.

A plurality of PAN IDs may be settable in the MAC processor 30. In this embodiment, the wireless communicator 10 includes the network processors 36 and 38 corresponding to two kinds of wireless networks. However, even if the communicator 10 includes three or more network processors, it suffices that two or more PAN IDs are settable. For instance, the PAN IDs corresponding to the respective network processors may be settable in the MAC processor 30. Alternatively, only the PAN IDs for some of the network processors equipped in the communicator 10 may be set.

The MAC processor 30 is also configured to supply the transmission frame signal to the wireless transmitter 46 when the processor 30 receives the transmission frame signal from the HEMS network processor 36 or the smart meter network processor 38 via the interface 40.

Next, the internal structure of the MAC processor 30 in the embodiment will be described in detail with reference to FIG. 2. The MAC processor 30 includes a frame type checker 64 for checking the type of a frame on the basis of the header information contained in the reception frame signal. More specifically, the frame type checker 64 checks the types of data frames, beacon frames, command frames and so on, on the basis of a control field contained in the header of the frame signal.

The MAC processor 30 further includes a frame controller 66, which compares the PAN ID contained in the header of the reception frame with PAN IDs preliminarily set in case that the frame type checker 64 determines that the reception frame signal indicates a data frame. If the PAN ID in the header is equivalent to one of the PAN IDs preliminarily set, the frame controller 66 supplies the reception frame signal to the interface 40. In this embodiment, the wireless communicator 10 preliminarily sets a PAN ID for the HEMS network processor 36 and another PAN ID for the smart meter network processor 38. Therefore, data frames destined for the HEMS network processor 36 and the smart meter network processor 38 can be supplied to the destined network processors in the higher layer.

The MAC processor 30 also includes a broadcast frame controller 68. When the reception frame signal and the destination address indicate a data frame and a broadcast address, respectively, the broadcast frame controller 68 makes the same number of copies of the reception frame signal as the network processors to supply the copies of the reception frame signal to the interface 40. In this embodiment, because the wireless communicator 10 includes the HEMS network processor 36 and the smart meter network processor 38, the broadcast frame controller 68 makes two copies of the reception frame signal.

The MAC processor 30 also includes a beacon frame controller 70. When the reception frame signal indicates a beacon request command frame, the beacon frame controller 70 makes a reply using address information on the HEMS network processor 36 and the smart meter network processor 38. More specifically, when a beacon request command frame is received, the beacon frame controller 70 can make a reply using the address information such as the MAC addresses of the HEMS network processor 36 and the smart meter network processor 38.

The MAC setter 32 is also connected with the HEMS network processor 36 and the smart meter network processor 38 via communication lines 72 and 74, respectively. The MAC setter 32 makes settings of the MAC layer according to the settings in these network processors 36 and 38. For example, the MAC setter 32 can determine the PAN IDs and address information for identifying each MAC layer such as the MAC addresses.

The MAC setter 32 includes a PAN ID storage 76 for storing the PAN IDs set in the HEMS network processor 36 and the smart meter network processor 38.

The MAC setter 32 also includes an address storage 78 for storing address information for identifying MAC layers, such as MAC addresses, according to the installations of the HEMS network processor 36 and the smart meter network processor 38.

The MAC setter 32 also includes a PAN ID controller 80 for giving a notice of the PAN IDs stored in the PAN ID storage 76 to the MAC processor 30. This permits the MAC processor 30 to recognize the PAN IDs of the plurality of network processors, more specifically, the HEMS processor 36 and the smart meter network processor 38.

When the PAN ID controller 80 receives the beacon request command frame, the controller 80 can give a notice of the address information on MAC layers, such as MAC addresses, according to the installations of the HEMS network processor 36 and the smart meter network processor 38. Therefore, when the wireless communicator 10 receives the beacon request command frame, the PAN ID controller 80 can make a reply using the address information on the HEMS network processor 36 and the smart meter network processor 38.

When the PAN ID controller 80 receives the PAN IDs from the HEMS network processor 36 and the smart meter network processor 38 to store the PAN IDs therein, the controller 80 can make a decision as to whether or not these PAN IDs are identical. If they are identical, the PAN ID controller 80 gives a notice that the PAN ID of the HEMS network processor 36 is identical to that of the smart meter network processor 38. Consequently, the wireless communicator 10 can avoid a conflict between the PAN IDs of the network processors.

The interface 40 transmits and receives information between the network processors, i.e. the HEMS network processor 36 and the smart meter network processor 38, and the MAC processor 30.

The interface 40 transmits and receives frame signals on the basis of the PAN IDs and the address information such as MAC addresses, which are set by the MAC setter 32.

In particular, the interface 40 supplies the transmission frame signals received from the HEMS network processor 36 and the smart meter network processor 38 to the MAC processor 30, as well as the PAN ID corresponding to the network processor being the source of the transmission frame signals.

The interface 40 receives the receive frame signal from the MAC processor 30. Furthermore, the interface 40 is instructed from the MAC processor 30 an instruction regarding the PAN ID of the network processor to which the receive frame signal will be transmitted. When receiving the instruction from the MAC processor 30, the interface 40 gives the receive frame signal to its corresponding network processor, on the basis of the PAN ID of the network processor to which the receive frame signal should be transmitted.

The HEMS network processor 36 performs processing regarding the network layer, which is instituted by the Open Systems Interconnection (OSI) reference model, of the wireless network 18a which is a HEMS network. In the processor 36, an intrinsic PAN ID is set.

The HEMS network processor 36 supplies the transmission frame signal via the interface 40 to the MAC processor 30 and further receives a reception frame from the MAC processor 30 via the interface 40. The HEMS network processor 36 further operates such that the PAN ID and the address information, such as MAC address, set in the processor 36 itself are also installed in the MAC setter 32.

The smart meter network processor 38 performs processing regarding the network layer, instituted by the OSI reference model, of the wireless network 18b which is a smart meter network. In this processor 38, an intrinsic PAN ID is set.

The smart meter network processor 38 supplies the transmission frame signals via the interface 40 to the MAC processor 30 and further receives reception frame signals from the MAC processor 30 via the interface 40. The smart meter network processor 38 operates such that the PAN ID and the address information, such as MAC address, set in the network processor 38 itself are also installed in the MAC setter 32.

Next, the operations of frame communications performed by the wireless communicator 10 of this embodiment will be described in detail with reference to Figures. The HEMS network processor 36 and the smart meter network processor 38 operate to install respective preset PAN IDs and address information into the MAC setter 32. The installation of the PAN IDs and address information into the MAC setter 32 may be performed prior to transmission or reception of a frame signal.

The MAC setter 32 sets the PAN IDs and address information derived from the network processors 36 and 38 into the PAN ID storage 76 and the address storage 78, respectively.

The PAN IDs and the address information may be correlated to the identification information on the network processors, for example, the port number and name of the respective network processors. More specifically, the identification information such as the port numbers of the network processors, PAN IDs and address information may be stored in an interrelated manner.

At this time, the PAN ID controller 80 in the MAC setter 32 makes a decision as to whether or not the PAN ID of the HEMS network processor 36 is identical with that of the smart meter network processor 38 to avoid a conflict between the PAN IDs.

Each PAN ID is a piece of identification information that is proper to respective PANs such as the wireless networks 18a and 18b. A PAN ID is set into some nodes by transmitting the PAN ID to nodes included in a common PAN. However, in conventional wireless communicator, the PAN ID may be transmitted to a node belonging to another PAN, which can cause a conflict between the PAN IDs.

Accordingly, in this embodiment, when the PAN ID controller 80 in the MAC setter 32 stores the PAN IDs of the HEMS network processor 36 and smart meter network processor 38, the controller 80 can determine the identity of these PAN IDs, thus avoiding a conflict between the PAN IDs.

For example, if the PAN ID of the HEMS network processor 36 is identical with that of the smart meter network processor 38, the PAN ID controller 80 informs the network processors 36 and 38 that a conflict between the PAN IDs occurs to make the network processors 36 and 38 reset their PAN IDs.

The operations for transmitting the frame signals performed by the wireless communicator 10 will be described below in detail by referring to FIGS. 1-3. In this embodiment, the HEMS network processor 36 transmits the frame signal. However, the above is also the case with the smart meter network processor 38 transmitting the frame signal.

When this processor 36 receives frame data from an application, not shown, at a higher layer, the network processor 36 supplies a frame signal containing the frame data to the interface 40.

The interface 40 supplies the frame data received from the HEMS network processor 36 to the MAC processor 30 and lets the MAC processor 30 know the PAN ID of the HEMS network processor 36 from which the frame signal is produced.

When the MAC processor 30 receives the frame data from the HEMS network processor 36 in order to transmit the transmission frame signal, the MAC processor 30 forms the transmission frame signal by the use of the PAN ID and address information of the HEMS network processor 36 to supply the transmission frame signal to the wireless transmitter 46.

FIG. 3 is an explanatory diagram illustrating the format of data frames of IEEE802.15.4. As shown in FIG. 3, the data frame format of IEEE802.15.4 includes a frame control field, a sequence number, a destination PAN ID, a destination address, a source PAN ID, a source address, a payload and a frame check sequence (FCS). When the MAC processor 30 generates the transmission frame signal, the processor 30 carries the PAN ID of the HEMS network processor 36 on the source PAN ID and further the address information of the HEMS network processor 36 on the source address.

Referring back to FIG. 2, the wireless transmitter 46 receives the transmission frame signal from the MAC processor 30 to transmit the transmission frame signal via the antenna 48 to the wireless network 18a.

Next, the operations for receiving a frame signal performed by the wireless communicator 10 of the embodiment will be specifically described below. In particular, exemplary operations performed when the wireless processor 10 receives a data frame destined for the smart meter network processor 38 will be described below.

Figure 4:
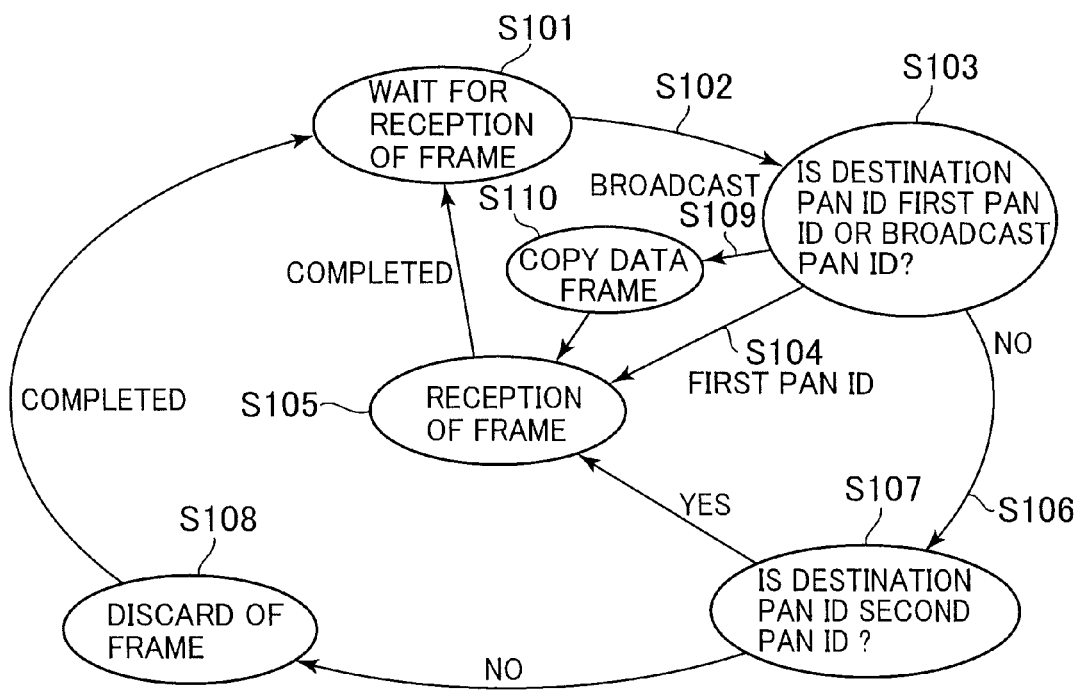
FIG. 4 is a state transition diagram representing a condition where frames are received by a media access control (MAC) processor in the embodiment.

FIG. 4 is a state transition diagram of the MAC processor 30 in this embodiment when a frame is received. When the wireless receiver 42 receives a wireless signal picked up and supplied by the antenna 44, the receiver 42 further supplies the received wireless signal to the MAC processor 30.

In an initial state, the MAC processor 30 is in a state waiting for reception of the frame, refer to S101 in FIG. 4. When the reception of the frame from the wireless receiver 42 is completed (S102), the frame type checker 64 in the MAC processor 30 determines that the received frame is a data frame on the basis of the header contained in the reception frame signal. More specifically, the frame type checker 64 determines that the received frame is a data frame on the basis of a frame control field, which is shown in FIG. 3, contained in the reception frame signal.

The PAN IDs of the HEMS network processor 36 and the smart meter network processor 38 are preliminarily stored in the PAN ID storage 76 in the MAC setter 32. A notice of these PAN IDs is given from the MAC setter 32 to the MAC processor 30. The frame type checker 64 in the MAC processor 30 determines any one of the PAN IDs of which a notice is given from the MAC setter 32 as a first PAN ID and the others as second PAN IDs. In this embodiment, the PAN ID of the smart meter network processor 38 is set as the first PAN ID, while the PAN ID of the HEMS network processor 36 is set as the second PAN ID.

Furthermore, the frame type checker 64 checks whether or not the destination PAN ID contained in the header of the received frame signal is any one of the first PAN ID or a broadcast frame (S103).

If the frame type checker 64 determines that the destination PAN ID is coincident with the first PAN ID (S104), the frame controller 66 receives the reception frame signal and processes the frame in the signal in the MAC layer stipulated at IEEE802.15.4g (S105). Then, the frame controller 66 supplies the processed frame signal via the interface 40 to the smart meter network processor 38. Consequently, the operations of receiving frames to be performed when the destination PAN ID is the PAN ID of the smart meter network processor 38 can be completed.

After the frame controller 66 completes the processing operations for receiving frames, the state of the MAC processor 30 makes a transition to a state waiting for frames again (S101).

On the contrary, if the frame type checker 64 determines that the destination PAN ID does not agree with the first PAN ID nor is the broadcast PAN ID indicative of broadcast frames (S106), the frame controller 66 further makes a decision as to whether or not the destination PAN ID agrees with the second PAN ID (S107).

If the frame controller 66 determines that the destination PAN ID agrees with the second PAN ID, the frame controller 66 performs receives and processes the reception frame signal in the MAC layer stipulated at IEEE802.15.4g to supply the processed frame signal via the interface 40 to the HEMS network processor 36 (S105). After completion of the operations on the frame reception, the MAC processor 30 makes a transition to a state waiting for reception of frames again (S101).

As previously described, even if the destination PAN ID is not coincident with the PAN ID of any one of the network processors, the MAC processor 30 determines whether or not the destination PAN ID is coincident with the PAN ID of the other network processors. Consequently, it is possible to prevent the reception frame signal from being discarded, unlike the conventional wireless communicators.

Figure 5:
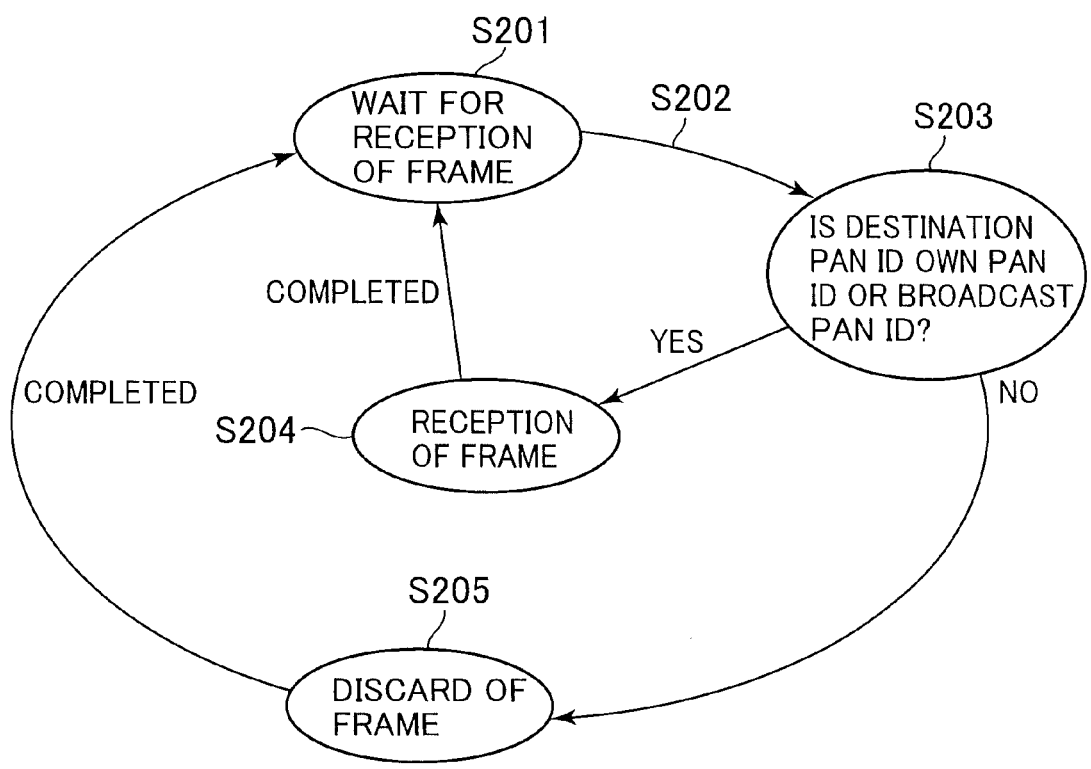
FIG. 5 is a state transition diagram illustrating a condition where frames are received by a MAC processor in a conventional wireless communicator.

For comparison, frame receiving operations performed by a conventional wireless communicator will be described below with reference to FIG. 5 which is a state transition diagram of the MAC processor in a conventional wireless communicator when frames are received.

In an initial state, the conventional MAC processor is in a state waiting for reception of frames, refer to S201. After completion of reception of a frame signal (S202), the conventional MAC processor checks whether or not the destination PAN ID contained in the header of the received frame signal is any one of a PAN ID preliminarily set in the wireless communicator or a broadcast PAN ID (S203). If the conventional MAC processor determines that the destination PAN ID is own PAN ID preliminarily set in the wireless communicator, the MAC processor receives the frame signal to process the frame in the signal in the MAC layer stipulated at IEEE802.15.4g (S204). On completion of this operation, the MAC processor makes a transition to a state waiting for reception of frames again (S201).

On the contrary, if the conventional MAC processor determines that the destination PAN ID of the reception frame signal is different from that set in the wireless communicator, the MAC processor compliant with the standardized technology of IEEE802.15.4g discards the reception frame signal (S205). On completion of the discarding operation, the MAC processor makes a transition to a state waiting for reception of frames again (S201).

Referring back to FIG. 4, if the frame type checker 64 in the embodiment determines that the destination PAN ID is different from the first PAN ID in step S103, the MAC processor 30 further makes a decision as to whether or not the destination PAN ID is coincident with the second PAN ID (step S107).

Consequently, the MAC processor 30 can make a decision as to whether or not the destination PAN ID is coincident with both PAN IDs of the HEMS network processor 36 and the smart meter network processor 38 equipped in the wireless communicator 10.

If the destination PAN ID of the reception frame signal is different from not only the first PAN ID but also the second PAN IDs (S107), the frame controller 66 performs an operation for discarding the reception frame signal, as stipulated at IEEE802.15.4g (S108). If the task of the discarding is completed, the MAC processor 30 makes a transition to a state waiting for reception of frames again (S101).

If the decision at step S103 is that the destination PAN ID is the broadcast PAN ID indicative of a broadcast frame (S109) that is to say, the destination address is the broadcast address, the broadcast frame controller 68 makes as many copies of the received data frame as network processors included in the wireless communicator 10 (S110). In this embodiment, the wireless communicator 10 includes two network processors, more specifically, the HEMS network processor 36 and the smart meter network processor 38. Consequently, the broadcast frame controller 68 makes copies to produce two data frames.

The broadcast frame controller 68 performs an operation for receiving data on the copied data frames to supply the processed data signal to the HEMS network processor 36 and the smart meter network processor 38 (S105). After this operation is completed, the MAC processor 30 makes a transition to a state waiting for reception of frames again (S101).

In this way, when the broadcast frame is received, the MAC processor 30 makes copies of data frames to supply the broadcast frames to all the network processors included in the wireless communicator 10.

In this embodiment, the first and the second PAN ID are set in the MAC processor, or MAC protocol stacks, which compares the destination PAN ID with the set two PAN ID. However, the number of PAN IDs set in the MAC processor 30 is not restricted to two. The number of PAN IDs that are set may be determined according to the number of network processors equivalent to the number of wireless networks with which the wireless communicator 10 is connected.

Figure 6:
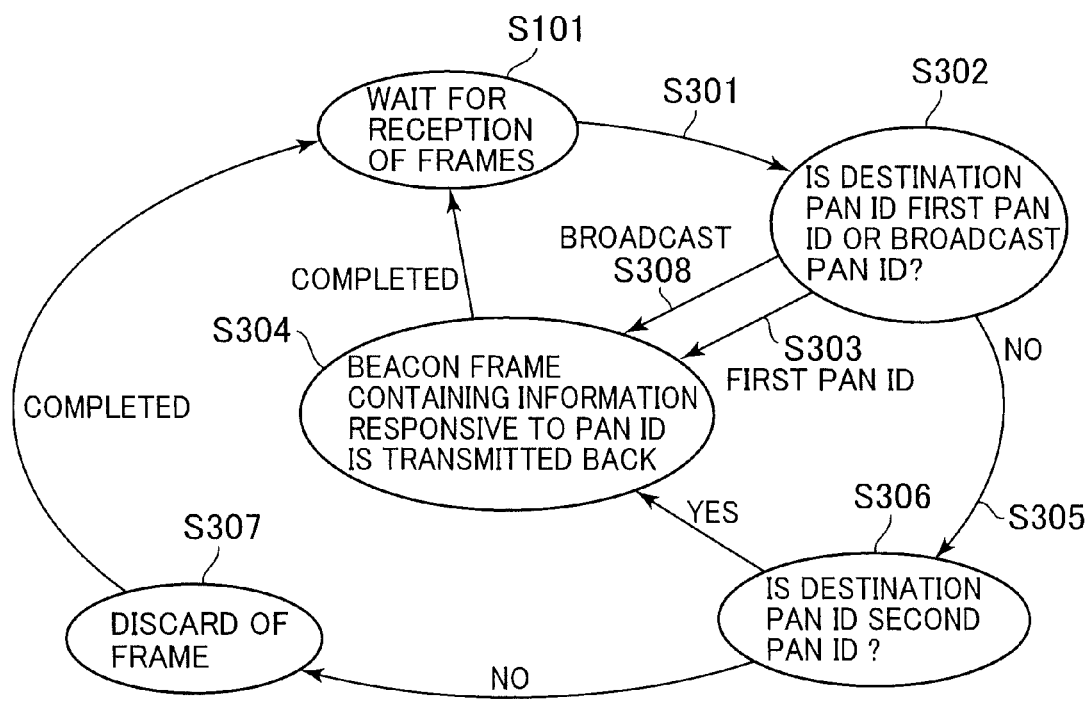
FIG. 6 is a state transition diagram illustrating a condition where beacon request command frames are received by the MAC processor in the embodiment.
Figure 7:
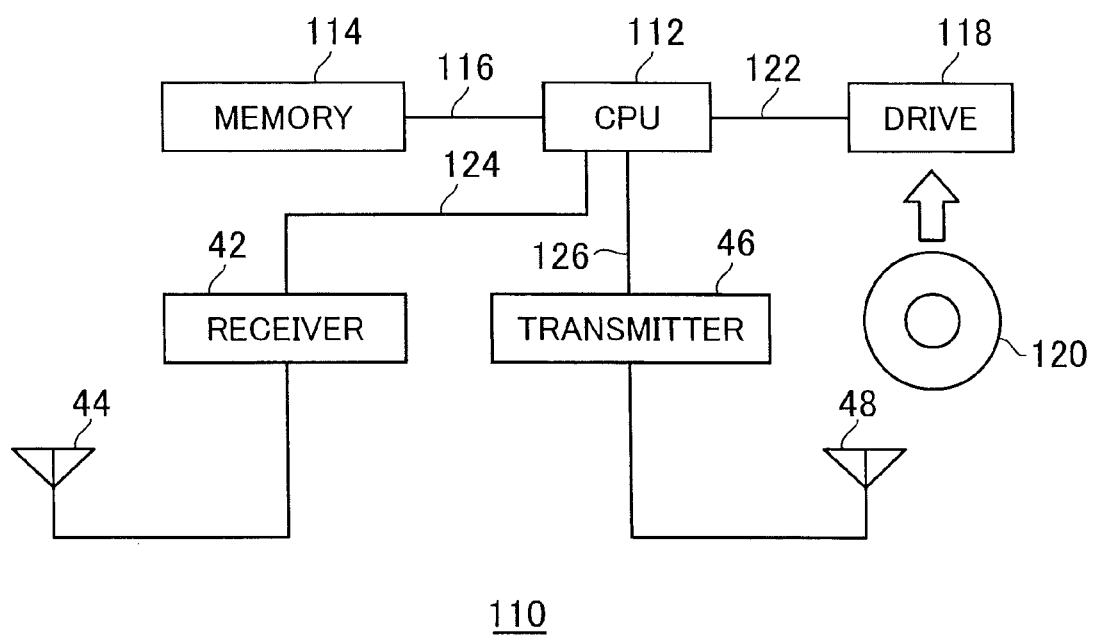
FIG. 7 is a schematic block program of a computer capable of serving as a wireless communicator in accordance with another embodiment of the invention.

FIG. 6 is a state transition diagram of the MAC processor 30 in this embodiment when a beacon request command frame is received. Next, the operations of the MAC processor 30 to receive the beacon request command frame will be described with reference to FIG. 6.

The beacon request command frame referred to herein can be broadcast by a parent node to peripheral nodes to prompt or permit participation in a network. The beacon request command frame can further be used by the parent node to ask nodes belonging to a certain PAN ID to offer information. The node receiving the beacon request command frame transmits back a beacon frame containing various types of information including information on its address and device capabilities in order to permit the parent node to recognize the presence of the peripheral node itself and further in order to give a notice of certain information to the parent node.

In an initial state, the MAC processor 30 is in a state waiting for reception of frames, refer to S101. When the MAC processor 30 received a reception frame signal, the frame type checker 64 determines that the reception frame signal indicates the beacon request command frame (S301).

The beacon frame controller 70 checks whether or not the destination PAN ID of the received beacon request command frame is any one of the first PAN ID or the broadcast PAN ID indicative of a broadcast frame (S302).

If the destination PAN ID of the beacon request command frame agrees with the first PAN ID (S303), the beacon frame controller 70 transmits back a beacon frame including information on the smart meter network processor 38 corresponding to the first PAN ID (S304).

The MAC processor 30 holds information which is to be inserted in the beacon frame and which is correlated to the PAN ID. The information correlated to the PAN ID includes at least address information on network processors. Along with the address information, the information correlated to the PAN ID may include information on the transmitting side devices such as device capabilities of the network processors corresponding to the respective address information, security keys and so on. Moreover, when the MAC processor 30 receives the beacon request command frame, the beacon frame controller 70 in the MAC processor 30 inserts information correlated to the destination PAN ID into the beacon frame to make a reply by supplying the beacon frame to the wireless transmitter 46. When the process on the reply is completed, the MAC processor 30 makes a transition to a state waiting for frames again (S101).

On the contrary, if the destination PAN ID of the beacon request command frame is not coincident with the first PAN ID (S305), the beacon frame controller 70 makes a decision as to whether the destination PAN ID is coincident with the second PAN ID (S306).

If the destination PAN ID is coincident with the second PAN ID, the beacon frame controller 70 transmits back a beacon frame into which information on the HEMS network processor 36 corresponding to the second PAN ID is inserted (S304). Also, in this case, the beacon frame controller 70 inserts information on at least the address of the HEMS network processor 36, the transmitting side devices and the security keys as the information correlated to the destination PAN ID into the beacon frame. Thereafter, the beacon frame controller 70 makes a reply by supplying the beacon frame including the above information to the wireless transmitter 46. When the process on the reply is completed, the MAC processor 30 makes a transition to a state waiting for frames again (S101).

If the destination PAN ID is neither the first nor the second PAN ID, it follows that the beacon frame command frame is not directed to the network processors installed in the wireless communicator 10. Thus, the MAC processor 30 discards the reception frame signal (S307). When the discarding process is completed, the MAC processor 30 makes a transition to a state waiting for frames again (S101).

If the decision at step S302 is that the destination PAN ID is the broadcast PAN ID indicative of a broadcast frame (S308), that is to say, the destination address is the broadcast address, the broadcast frame controller 68 generates a beacon frame in which information correlated to the first PAN ID is inserted and another beacon frame in which information correlated to the second PAN ID is inserted. The MAC processor 30 transmits back these two beacon frames via the transmitter 46 to the wireless networks 18a and 18b (S304). When the transmitting process of the beacon frames is completed, the MAC processor 30 makes a transition to a state waiting for frames again (S101).

In this embodiment, when the beacon request command frame is received, the beacon frame which the beacon frame controller 70 transmits back may be of a type determined depending on the number of sets of address information correlated to the PAN IDs installed in the MAC processor, or MAC protocol stacks.

Information corresponding to one of the PANIDs to be inserted into the beacon frame may be previously determined when transmitting the beacon frame. This can reduce the communication traffic of the beacon frames to be transmitted back when the beacon request command frame is received.

As described above, this embodiment of the wireless communicator can receive a frame signal having a PAN ID corresponding to one of the network processor installed in the wireless processor without resetting PAN IDs by setting the respective PAN IDs of the network processors into the MAC processor. Thus, increased convenience is offered to the wireless communicator.

In the description of the above-described embodiment, the possibility of various modifications are mentioned. For example, the present invention can be also applied to a following alternative embodiment.

An alternative embodiment of the invention can be implemented by use of a computer 110 including a central processing unit (CPU) 112 for processing information, calculating numerical data and controlling the processing performed by the computer 110, a memory 14, which is connected with the CPU 112 via a communication line 116, for storing information and programs and other various devices, not shown. The computer 110 may further includes a drive 118 for reading in data and program stored in a data storage medium 120. The drive 118 is connected with the CPU 112 via a communication line 122 so that the CPU 112 can control reading operations of the program stored in the data storage medium 120. The data storage medium 120 stores a program for letting the computer 110 serve as the wireless communicator 10 in accordance with the alternative embodiment of the invention. The data storage medium 120 can be in form of every known storage medium, more specifically a compact disk (CD), a digital versatile disk (DVD), a magnetic disk, a magnetic optical disk, a flash memory or the like.

The computer 110 may integrally include the wireless receiver 42 with the antenna 44 and the wireless transmitter 46 with the antenna 48. In this case, the CPU be directly or indirectly connected with the receiver 42 and the transmitter via communication lines 124 and 126, respectively. Otherwise, the computer 110 can be later connected with an external communication device including the wireless receiver 42 with the antenna 44 and the wireless transmitter 46 with the antenna 48.

In this way, when the program in the data storage medium 120 is written in the memory 114 via the drive 118, the computer 110 can behave as the wireless communicator 10. More specifically, the computer 110 storing the program can let the CPU 112 serves as the network processors 36 and 38, the MAC processor 30, the interface 40 and the PAN ID controller 80 in the MAC setter 32, for instance. Furthermore, the computer 110 can let the memory 114 serve as the PAN ID storage 76 and the address storage 78.

The entire disclosure of Japanese patent application No. 2013-268631 filed on Dec. 26, 2013, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A wireless communicator comprising:
   a plurality of network processors transmitting data to, and receiving data from, respective different networks, the plurality of network processors including at least a first network processor for processing information directed to, and from, a first network and a second network processor for processing information directed to, and from, a second network different from the first network;
   a media access control (MAC) setter receiving pieces of information on a MAC layer from each of said plurality of network processors and storing the pieces of information on the MAC layer, said pieces of information including a separate personal area network identifier (PAN ID) for each of the plurality of network processors;
   a MAC processor performing operations on media access control on a basis of the pieces of information stored in said MAC setter;
   an interface connecting each of the plurality of network processors to the MAC processor;
   a wireless receiver connected to the MAC processor; and
   a wireless transmitter connected to the MAC processor,
   wherein the MAC processor is configured to receive a data frame from the wireless receiver, compare a PAN ID of the frame with stored PAN IDs set by the MAC setter corresponding to the plurality of network processors, and transmit the frame to the respective network processor among the plurality of network processors via the interface according to the PAN ID of the frame, and
   wherein each of said plurality of network processors is configured to receive data from a respective application and to supply a frame signal containing network identification information corresponding to said respective network processors to said MAC processor based on the data received from the respective application, the MAC processor is configured to generate a transmission frame signal based on the data received from the respective network processors, the transmission frame signal including a PAN ID of the respective network processor from which the data was received, and the MAC processor is configured to transmit the transmission frame signal to the wireless transmitter.

2. The wireless communicator in accordance with claim 1, wherein said MAC setter sets a plurality of network identification information into said MAC processor.

3. The wireless communicator in accordance with claim 1, wherein said MAC setter sets a plurality of address information for identifying said MAC processor.

4. The wireless communicator in accordance with claim 2, wherein said MAC processor gives a reception frame signal to one or more of said network processors to be destined, on a basis of destination network identification information and/or destination address information contained in a header of the reception frame signal.

5. The wireless communicator in accordance with claim 2, wherein said MAC processor gives a reception frame signal to all of the plurality of network processors when the reception frame signal is a broadcast frame signal.

6. The wireless communicator in accordance with claim 5, wherein said MAC processor makes copies of the received broadcast frame signal to give the reception frame signal to all of said plurality of network processors.

7. The wireless communicator in accordance with claim 2, wherein said MAC processor generates a beacon frame signal including information correlated to the network identification information contained in a received beacon request command frame signal to transmit back the beacon frame signal to a signal transmitter of the beacon request command frame signal.

8. The wireless communicator in accordance with claim 7, wherein information on devices constructing the signal transmitter including at least address information to be inserted in the beacon frame signal is correlated to the plurality of network identification information.

9. The wireless communicator in accordance with claim 7, wherein said MAC processor generates a type of beacon frame signal determined depending on the number of sets of address information in response to the received beacon request command frame signal and further transmits back the beacon frame signal.

10. The wireless communicator in accordance with claim 2, wherein said MAC setter determines whether or not one of the plurality of network identification information is identical with another one of the plurality of the network identification information to give a notice a result of the determination to said network processors if said MAC setter determines these network identification information are identical with each other.

11. A non-transitory computer-readable data storage medium having a computer program recorded, said computer program controlling a computer, when installed and run, to function as a wireless communicator comprising:
a plurality of network processors transmitting data to and receiving data from respective different networks, the plurality of network processors including at least a first network processor for processing information directed to, and from, a first network and a second network processor for processing information directed to, and from, a second network different from the first network;
a media access control (MAC) setter receiving pieces of information on a MAC layer from the plurality of network processors and storing the pieces of information on the MAC layer, said pieces of information including a separate personal area network identifier (PAN ID) for each of the plurality of network processors;
a MAC processor performing operations on media access control on a basis of the pieces of information stored in the MAC setter;
an interface connecting each of the plurality of network processors to the MAC processor;
a wireless receiver connected to the MAC processor; and
a wireless transmitter connected to the MAC processor, wherein the MAC processor is configured to receive a data frame from the wireless receiver, compare a PAN ID of the frame with stored PAN IDs set by the MAC setter corresponding to the plurality of network processors, and transmit the frame to the respective network processor among the plurality of network processors via the interface according to the PAN ID of the frame, and
said computer program further controlling said computer functioning as the wireless communicator, such that each of the plurality of network processors is configured to receive data from a respective application, to generate a frame signal containing network identification information corresponding to the respective network processors, and to supply the frame signal to the MAC processor based on the data received from the respective application, the MAC processor is configured to generate a transmission frame signal based on the data received from the respective network processors, the transmission frame signal including a PAN ID of the respective network processor from which the data was received, and the MAC processor is configured to transmit the transmission frame signal to the wireless transmitter.

12. The data storage medium in accordance with claim 11, wherein said computer program further controls said computer so that the MAC setter sets a plurality of network identification information into the MAC processor.

13. The data storage medium in accordance with claim 11, wherein said computer program further controls said computer so that the MAC setter sets a plurality of address information for identifying the MAC processor.

14. The data storage medium in accordance with claim 12, wherein said computer program further controls said computer so that the MAC processor gives a reception frame signal to one or more of the network processors to be destined, on a basis of destination network identification information and/or destination address information contained in a header of the reception frame signal.

15. The data storage medium in accordance with claim 12, wherein said computer program further controls said computer so that the MAC processor gives a reception frame signal to all of the plurality of network processors when the reception frame signal is a broadcast frame signal.

16. The data storage medium in accordance with claim 15, wherein said computer program further controls said computer so that the MAC processor makes copies of the received broadcast frame signal to give the reception frame signal to all of the plurality of network processors.

17. The data storage medium in accordance with claim 12, wherein said computer program further controls said computer so that the MAC processor generates a beacon frame signal including information correlated to the network identification information contained in a received beacon request command frame signal to transmit back the beacon frame signal to a signal transmitter of the beacon request command frame signal.

18. The data storage medium in accordance with claim 17, wherein said computer program further controls said computer so that information on devices constructing the signal transmitter including at least address information to be inserted in the beacon frame signal is correlated to the plurality of network identification information.

19. The data storage medium in accordance with claim 17, wherein said computer program further controls said computer so that the MAC processor generates a type of beacon frame signal determined depending on the number of sets of address information in response to the received beacon request command frame signal and further transmits back the beacon frame signal.

20. The data storage medium in accordance with claim 12, wherein said computer program further controls said computer so that the MAC setter determines whether or not one of the plurality of network identification information is identical with another one of the plurality of the network identification information to give a notice a result of the determination to said network processors if the MAC setter determines these network identification information are identical with each other.

\* \* \* \* \*